(12) United States Patent
Cok et al.

(10) Patent No.: US 7,111,939 B2
(45) Date of Patent: Sep. 26, 2006

(54) IMAGE DISPLAY SYSTEM WITH BODY POSITION COMPENSATION

(75) Inventors: Ronald S. Cok, Rochester, NY (US); Mark E. Bridges, Spencerport, NY (US)

(73) Assignee: Eastman Kodak Company, Rochester, NY (US)

( * ) Notice: Subject to any disclaimer, the term of this patent is extended or adjusted under 35 U.S.C. 154(b) by 314 days.

(21) Appl. No.: 10/084,119

(22) Filed: Feb. 27, 2002

(65) Prior Publication Data

US 2002/0135738 A1  Sep. 26, 2002

Related U.S. Application Data

(63) Continuation-in-part of application No. 09/766,899, filed on Jan. 22, 2001, now abandoned.

(51) Int. Cl.
*G03B 21/00* (2006.01)
*G03B 21/26* (2006.01)
*G09G 5/00* (2006.01)
*G02B 27/14* (2006.01)
*G09B 19/16* (2006.01)

(52) U.S. Cl. ............... 353/7; 353/28; 345/7; 359/630; 434/44

(58) Field of Classification Search ............... 353/7, 353/122, 28; 345/7–8; 359/630, 632; 434/44, 434/48

See application file for complete search history.

(56) References Cited

U.S. PATENT DOCUMENTS

| | | | | |
|---|---|---|---|---|
| 3,790,261 A | * | 2/1974 | Threlkeld | ............... 352/72 |
| 4,089,597 A | * | 5/1978 | Collender | ............... 352/53 |
| 4,241,519 A | | 12/1980 | Gilson et al. | ............ 348/257 |
| 4,962,998 A | | 10/1990 | Iino | .................. 345/7 |
| 5,016,282 A | * | 5/1991 | Tomono et al. | ......... 382/117 |
| 5,671,992 A | * | 9/1997 | Richards | ................. 353/7 |
| 5,731,902 A | | 3/1998 | Williams et al. | ......... 359/201 |
| 5,953,156 A | * | 9/1999 | Muench | .............. 359/464 |
| 5,954,508 A | * | 9/1999 | Lo et al. | ................. 434/55 |
| 6,011,526 A | | 1/2000 | Toyoshima et al. | ..... 345/156 |
| 6,120,461 A | | 9/2000 | Smyth | ................ 351/209 |
| 6,163,336 A | * | 12/2000 | Richards | .............. 348/42 |
| 6,416,181 B1 | * | 7/2002 | Kessler et al. | ............. 353/7 |
| 6,511,182 B1 | * | 1/2003 | Agostinelli et al. | ........ 353/7 |
| 6,522,474 B1 | * | 2/2003 | Cobb et al. | ............. 359/633 |
| 2002/0167462 A1 | * | 11/2002 | Lewis et al. | ............... 345/7 |

FOREIGN PATENT DOCUMENTS

| EP | 0 350 957 A3 | | 1/1990 |
|---|---|---|---|
| JP | 10090592 A | * | 4/1998 |

OTHER PUBLICATIONS

U.S. Appl. No. 09/738,747, filed Dec. 15, 2000 by Kessler et al., entitled A Monocentric Autostereoscopic Optical Apparatus and Method.

* cited by examiner

*Primary Examiner*—W. B. Perkey
*Assistant Examiner*—Magda Cruz
(74) *Attorney, Agent, or Firm*—Thomas H. Close

(57) ABSTRACT

An image display system includes: an image projector including a mirror optical element for forming an exit pupil for viewing an image at a viewing location; a viewer eye position detector for generating a signal representing the position of a viewer's eyes relative to the location; and a control system responsive to the signal for providing relative motion between the viewer and the image projector to maintain the viewer's eyes at the exit pupil.

30 Claims, 3 Drawing Sheets

IMAGE DISPLAY SYSTEM WITH BODY POSITION COMPENSATION

CROSS REFERENCE TO RELATED APPLICATIONS

This is a Continuation-in-Part of U.S. application Ser. No. 09/766,899, filed Jan. 22, 2001, now abandoned, entitled "An Image Display System with Body Position Compensation" by Ronald S. Cok, et al.

FIELD OF THE INVENTION

The present invention relates to a mechanical system to align an individual viewer with a projected image, in particular to such systems that compensate for the viewer's size and position.

BACKGROUND OF THE INVENTION

There are numerous systems for the presentation of electronic imagery to viewers. The simplest use projectors for multiple viewers designed to project an image on a viewing surface, such as a screen. Common examples are film or movie projectors and slide or transparency projectors. Other systems are limited to single viewers. For example, head-mounted displays using special glasses allow viewers to move their head while images are optically superimposed on real scenes. More immersive systems entirely obscure a viewer's field of view and replace it with a synthetic view. These systems typically utilize a computer-controlled projector to present the imagery through a suitable optical system. The computer can also provide an interactive experience through the use of image processing and viewer feedback devices.

Immersive systems can be either portable or fixed. Portable systems typically utilize glasses or visors that obscure any sight of the real world and project a synthetic image either into the viewer's eyes or onto a personal screen seen only by the viewer. Fixed systems are generally placed within a special environment with appropriate fixtures and a screen onto which is projected the synthetic image. Viewers enter the environment to view the imagery. Training systems such as flight simulators typically use this approach. Alternatively, fixed systems can project images directly into a viewer's eyes (rather than onto a screen) while the viewer is seated in a fixed position. U.S. Ser. No. 09/738,747 filed Dec. 15, 2000 entitled A Monocentric Autostereoscopic Optical Apparatus and Method, describes such a system.

Systems that project images into a viewer's eyes, in particular stereoscopic viewing systems, require careful alignment of the image projectors with the viewer's eyes. This is problematic, since viewers are of different sizes and frequently move their head in a multiplicity of directions: forward and backward, up and down, left and right, and rotationally around any of three axes. With head-mounted systems this problem is obviated by fixing the projector's position with respect to the eyes (for example with glasses).

Systems that project images directly into a viewer's eyes but are not mounted on the viewer's head must compensate for the relative position and movement of the viewer's eyes with respect to the image projector to ensure that the image is projected into the viewer's eyes. This can be done by tracking the position of the viewer's eyes. Such eye-tracking systems are well known and very sophisticated. For example, EP 0 350 957 A3 entitled Image Pickup Apparatus and Eye Tracking Method Using the Same describes such a system. Compensation for the relative motion of the viewer's head and the image projected by the projection apparatus is then calculated with a computer and the components within the projector are moved to re-align the image with the viewer's eyes. However, the range and type of motion accommodated by the projection system can be very restricted, typically to compensate for a lateral movement of the head from left to right or vice versa. This restricts the viewer's natural body movement and leads to fatigue while viewing. Moreover, viewers of different size cannot be readily or comfortably accommodated.

There is a need, therefore, for an improved system to compensate for viewer movement in a system that projects images into a viewer's eyes so as to align a projected image with a viewer's eyes.

SUMMARY OF THE INVENTION

This need is met according to the present invention by providing an image display system that includes an image projector including a mirror optical element for forming an exit pupil for viewing an image at a viewing location; a viewer eye position detector for generating a signal representing the position of a viewer's eyes relative to the location; and a control system responsive to the signal for providing relative motion between the viewer and the image projector to maintain the viewer's eyes at the exit pupil.

ADVANTAGES

The image display system of the present invention has the advantage of accommodating a larger variety of viewer body types and compensating for a greater range of viewer motion during viewing.

DETAILED DESCRIPTION OF THE INVENTION

The present invention is a mechanical system for adjusting the relative position of a viewer's eyes and an image projected through an exit pupil and utilizing a mirror apparatus (rather than a screen) as an element of the image projector. The adjustment is accomplished at two levels: first, at a fine level by moving elements within the image projector to adjust the position of the exit pupil and second, at a gross level by moving either the viewer's eyes or the position of the entire projector, including the mirror. The position of the viewer's eyes is found through the use of an eye-position detector that is connected to a control device. The control device controls the position of either an adjustable rest for the viewer or an adjustable frame for locating the image projector and the position of imaging elements within the image projector to align the image exit pupil(s) with a viewer's eyes. Typically, fine, high-frequency movement is accommodated by changing the position of imaging elements in the image projector and large, low-frequency movements are accommodated by moving either the adjustable viewer rest or the adjustable projector frame. In particular, when a viewer first begins to use the viewing system the control device first adjusts the position of either the adjustable viewer rest or the adjustable projector frame to place the viewer's eyes in a nominal position with respect to the exit pupil(s) so as to maximize the usable range of the image projector. The display system may utilize multiple projectors and exit pupils to provide stereo imagery and a separate image to each of the viewer's eyes.

Figure 1:
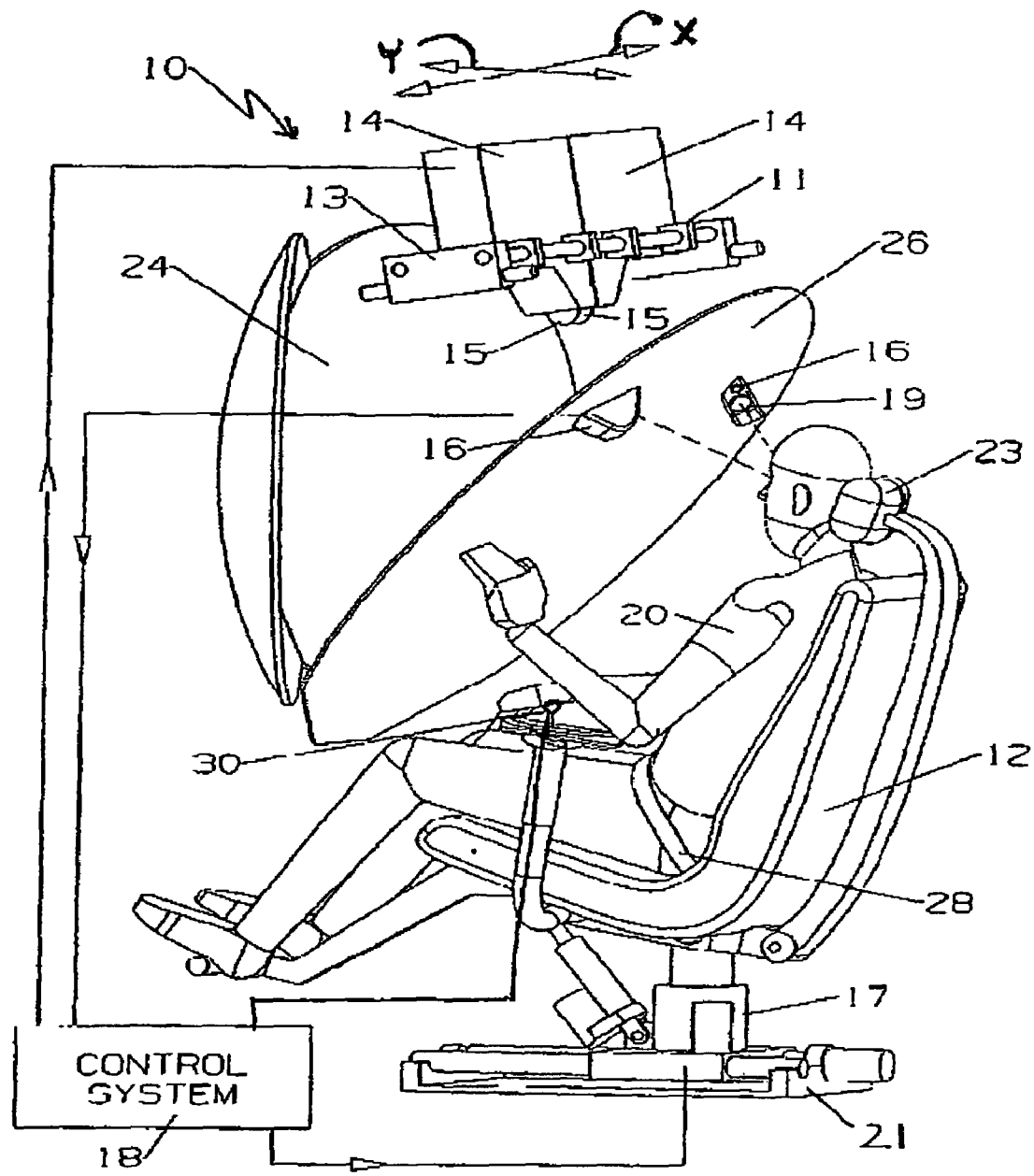
FIG. 1 is a perspective view of a display system according to the present invention.

Referring to FIG. 1 in a first embodiment, an image display system 10 includes an adjustable rest such as a chair 12, an image projector 14, an eye position detector including cameras 16 provided with light sources 19 for emitting non-visible radiation such as infrared radiation, and a controller 18. An example of an eye position detector suitable for use with the present invention is shown aforementioned European patent EP 0 350 957 A3. Components of the image projector 14 can be mounted to enable X-Y translation of the exit pupils for example on translation stages 11 and 13, respectively. Alternatively, an adjustable optical element or elements, such as a moveable mirror or lens can be employed to adjust the position of the image formed by the display system. The chair 12 is moveable for example in the X-Y and Z directions by a servo-mechanism 17 mechanically connected to the chair 12 and controlled by the controller 18. The servo-mechanism 17 may also be capable of rotating the chair about one or more axes such as the horizontal and vertical axes. Alternatively, the chair may be moveable with six degrees of freedom. In operation, the controller 18 first sets the position of the exit pupils by adjusting the image projector components to a nominal position that maximizes the image projector's range of adjustment. The eye position detector 16 located in front of a viewer 20 detects the position of the viewer's eyes. The eye position detector includes an image processor for detecting the location of the viewer's eyes within the image(s) produced by camera(s) 16 and generates eye-position information. This eye-position information is sent to the controller 18 and is compared to the exit pupil location provided by the image projector 14. If the positions are different, the controller 18 will adjust the position of either the projected image or the adjustable chair 12 to align the viewer's eyes with the predetermined image location. The adjustable rest 12 may include a head-rest 23 for positioning the viewer's head with respect to the projected image. Small, quick movements of the viewer's eyes are accommodated by adjusting elements of the image projector to align the exit pupil(s) with the viewer's eye(s). Large, slow movements of the viewer's eyes are accommodated by moving the adjustable rest to relocate the viewer's eyes in the nominal position.

The details of a suitable image projector 14 are described in U.S. Ser. No. 09/738,747, which is incorporated herein by reference. The autostereoscopic image projector 14 includes a pair of known liquid crystal projection projectors with ball lens projection optics 15. The ball lens projection optics 15 cooperate with spherical mirror 24 and a beam splitting mirror 26 to create an image at a viewing pupil at a predetermined location in front of the adjustable rest 12.

Figure 2:
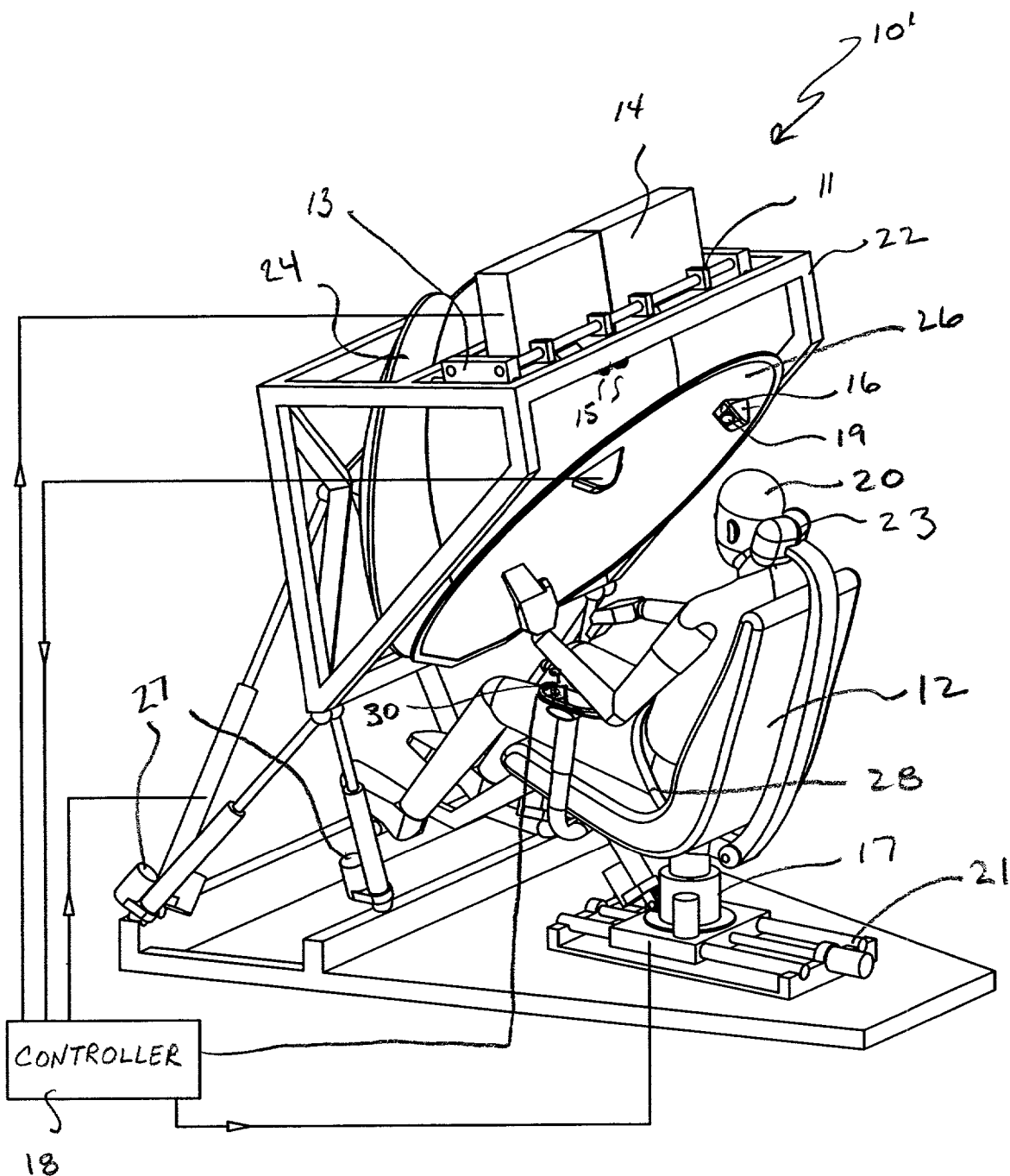
FIG. 2 is a perspective view of another embodiment of the display system according to the present invention.

Referring to FIG. 2 in a second embodiment, an image display system 10' includes an adjustable frame 22, an image projector 14, an eye position detector including cameras 16 provided with light sources 19 for emitting non-visible radiation such as infrared radiation, and a controller 18. An example of an eye position detector suitable for use with the present invention is shown aforementioned European patent EP 0 350 957 A3. Components of the image projector 14 can be mounted to enable X-Y translation of the exit pupils for example on translation stages 11 and 13. Alternatively, an adjustable optical element, such as a moveable mirror or lens (not shown) can be employed to adjust the position of the image formed by the display system. The frame 22 is moveable for example in the X-Y and Z directions or rotatable about multiple axes by a servo-mechanisms 27 mechanically connected to the frame 22 and controlled by the controller 18. The servo-mechanism 27 may also be capable of rotating the frame about one or more axes such as the horizontal and vertical axes. In operation, the controller 18 first sets the position of the exit pupils by adjusting the image projector components to a nominal position that maximizes the image projector's range of adjustment. The eye position detector 16 located in front of a viewer 20 detects the position of the viewer's eyes. The eye position detector includes an image processor for detecting the location of the viewer's eyes within the image(s) produced by camera(s) 16 and generates eye-position information. This eye-position information is sent to the controller 18 and is compared to the exit pupil location provided by the image projector 14. If the positions are different, the controller 18 will adjust the position of either the projected image or the adjustable frame 22 to align the viewer's eyes with the predetermined image location. Since components of the image projector 14 are likely to have much less mass than the viewer, small, quick movements of the viewer's eyes are accommodated by adjusting elements of the image projector to align the exit pupil(s) with the viewer's eye(s). Large, slow movements of the viewer's eyes are accommodated by moving the adjustable frame to relocate the entire image projector in the nominal position.

Generally, image projection systems that project an image into the eye and that are not head mounted have a very limited range over which a viewer can move and, more critically, can only accommodate movement in a few dimensions, typically left-to-right or lateral motion with respect to the viewer's eyes together with a limited rotation about the same axis. Hence, any significant motion up or down, or forward and backward, or any tilting of the head on the part of the viewer cannot be accommodated and the image will no longer be projected into the viewer's eyes. Moving the adjustable rest 12 or frame 22 compensates for these motions. If the viewer sits up, for example, the rest descends or frame ascends, if the viewer leans forward, the rest or frame moves back. Although it is more difficult and expensive to implement, the rest or frame can also rotate to accommodate head tilt. This can be particularly useful for adjusting to extreme variations in viewer height. However, this rotation must be limited to avoid disturbing the viewer. In extreme cases, the viewer can use a restraint, such as a seat belt 28 to prevent falling out of the chair and larger amounts of rotation accepted. The restraint may also serve to give the viewer a feeling of greater security and to reduce disorientation or motion sickness. Manual controls 30 can be provided to override the automatic control system. The manual override may also provide additional safety in that the viewer can override the system in the case of any difficulties.

The eye position detector detects the position of the viewer's eyes in a plane normal to the projection of the viewed image (x-y plane), as is well known in the art. As described above, the position of the viewer's eyes relative to the exit pupils can be adjusted by moving the adjustable rest or the adjustable frame in that plane. The eye position detector can also be extended to incorporate positional information about the closeness of the viewer (i.e. forward and back or closeness to the projector, the z axis). The eye position detector in a dual camera system can calculate the eye position along a line in space for each camera. Given fixed cameras in known positions and the position of an eye in the field of each camera, the intersection of the lines in space is the position of the eye. This can be calculated precisely but a simpler approach is to look at relative changes in position. As the viewer's eye position moves to the left in the field of view of a left-side camera and to the right in a right-side camera, the viewer is moving away. As the viewer's eye position moves to the right in a left-side camera field of view and to the left in a right-side camera field of view, the viewer is moving closer.

Figure 3:
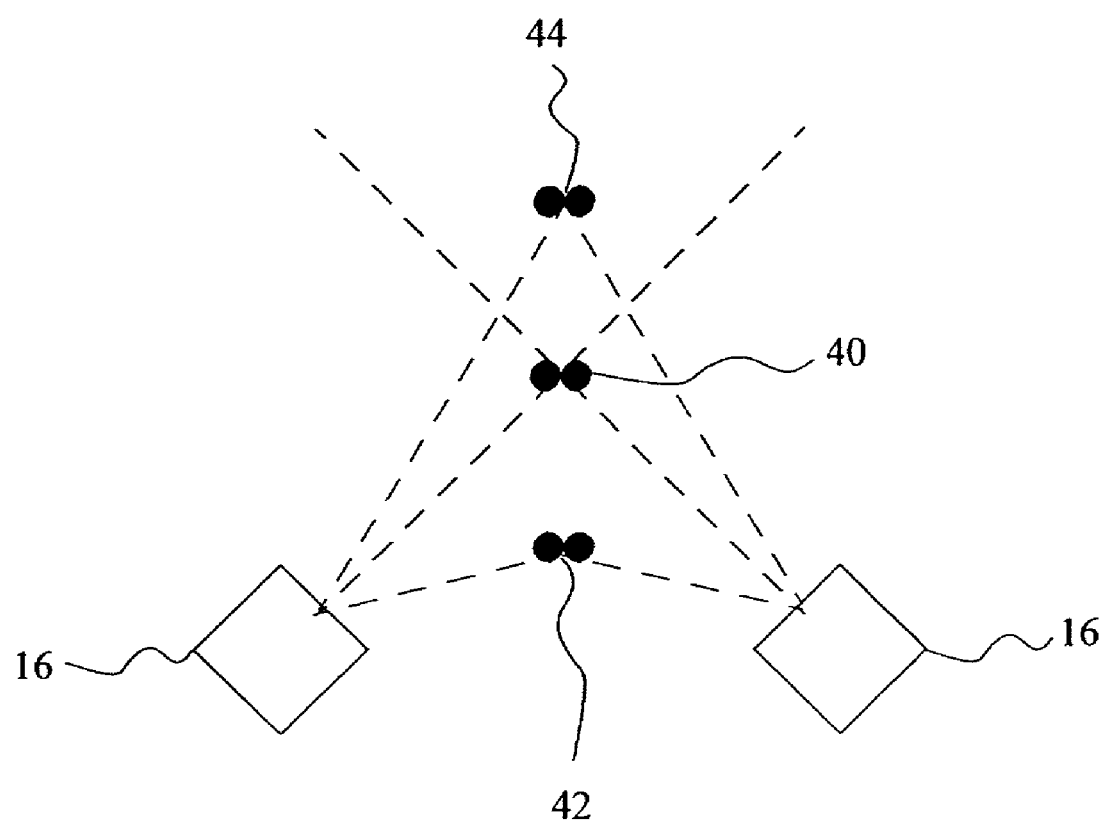
FIG. 3 is a schematic diagram useful in describing an eye position tracking system used with the present invention.

Referring to FIG. 3, cameras 16 record the position of a viewer's eyes in a nominal position 40. If the viewer moves forward (closer to the cameras), the eyes move to position 42 and as the viewer moves backwards the eyes move to position 44. This information is readily integrated with information about viewer eye position in the normal (x-y) plane. Whenever the direction of motion in each camera is different, motion forward and back is implied. When the direction of motion in each camera's field of view is in the same direction and of a comparable magnitude, the motion is to the left or right or up or down. Additional cameras (not shown) in front of the viewer can be used to improve the accuracy of the triangulation. Alternatively, additional cameras (not shown) can be added to the system to directly measure movement in any direction simply by placing the cameras, for example, above, to the side of, and in front or back of the viewer. It is also useful to mount the cameras on the image projector frame. If the frame moves, the camera's field of view is increased, thereby increasing the usable range of the system. Indeed, if information about the position of the viewer's eyes is lost, the system can move the adjustable rests throughout their entire range to recover the viewer's eye position information.

An eye position detector can also be used to control the perceptual location of sound from a multi-dimensional audio system. Viewer experiences of motion images are greatly enhanced with the use of a sophisticated audio sound-track. For example, movie houses and home stereo systems have sophisticated means to create audio experiences. These audio systems control the apparent location of sound sources. When these complement a visual scene, a more powerful illusion is created for the participant. When the viewer moves, an apparent audio source can compensate for the new position of the viewer to maintain the illusion of presence in the audio-visual scene. Use of eye position information can be used to provide feedback to the audio system.

The image display system of the present invention can be mounted on a motion platform (not shown) to create an even more immersive experience by moving the viewer in concert with the apparent motion of the image content seen by the viewer. Motion platforms are used widely in interactive games and in rides to provide the participants with a sense of motion matched to the imagery presented.

The adjustable rest 12 can also be designed to move the viewer from an initial position allowing ready access to the rest to a viewing position. Alternatively, the image projector frame 22 can be moved out of the way to allow easy ingress or egress to the system. For example, a viewing system might be difficult to enter. By moving the rest or frame to a position where a viewer can readily sit down or recline upon the rest, the viewer's needs may be accommodated. Once seated or comfortably positioned upon the rest, the rest can be moved to an optimal viewing position. This can be particularly helpful for viewers with limited mobility.

The present invention will accommodate viewers of different physical height and body styles such as long or short trunks, necks, legs, etc. Simple low-frequency movements in various directions are readily accommodated, greatly improving the comfort of viewers while maintaining a good alignment with the projected exit pupil. This provides a much more natural viewing experience accessible to a greater variety of people and with a more consistent viewing experience.

The invention has been described in detail with particular reference to certain preferred embodiments thereof, but it will be understood that variations and modifications can be effected within the spirit and scope of the invention.

| PARTS LIST | |
|---|---|
| 10, 10' | image display system |
| 11 | translation stage |
| 12 | adjustable chair |
| 13 | translation stage |
| 14 | autostereoscopic image projector |
| 15 | ball lens projection optics |
| 16 | eye position detector camera |
| 17 | servo mechanism |
| 18 | controller |
| 19 | light source for emitting non visible radiation |
| 20 | viewer |
| 21 | motion platform |
| 22 | adjustable frame |
| 23 | head-rest |
| 24 | spherical mirror |
| 26 | beam splitting mirror |
| 27 | servo mechanisms |
| 28 | seat belt |
| 30 | manual controls |
| 40 | nominal eye position |
| 42 | eye position |
| 44 | eye position |

What is claimed is:

1. An image display system, comprising:
   a) an image projector including a mirror optical element for forming an exit pupil for viewing an image at a viewing location;
   b) a viewer eye position detector for generating a signal representing the position of a viewer's eyes relative to the location; and
   c) a control system responsive to the signal for providing relative motion between the viewer and the image projector to maintain the viewer's eyes at the exit pupil;
   wherein the image display system further includes an adjustable rest for positioning a viewer relative to the image projector and the control system adjusts the position of the adjustable rest.

2. The image display system claimed in claim 1, wherein the control system adjusts the position of the image projector.

3. The system claimed in claim 2, wherein the image projector includes means for adjusting the location of the exit pupil.

4. The image display system claimed in claim 2, wherein the image projector is adjustable to move the image projector in a horizontal or vertical direction.

5. The image display system claimed in claim 2, wherein the image display system inclides an adjustable frame for mounting the image projector.

6. The image display system claimed in claim 5, wherein the adjustable frame is moveable in a horizontal or vertical direction.

7. The image display system claimed in claim 5, wherein the adjustable frame is rotatable about one or more axes.

8. The image display system claimed in claim 2, wherein the control system adjusts the position of the mirror optical element.

9. The image display system claimed in claim 8, wherein the image projector contains a multiplicity of optical elements and light valves and the control system adjusts both the position of the optical elements and the light valves and the position of the mirror optical element independently.

10. The system claimed in claim 2, wherein the image projector is adjustable to move the predetermined image locaiton and wherein the control system adjusts the image projector in coordination with the adjustable rest to locate the viewer's eye at the exit pupil.

11. The image display system claimed in claim 1, wherein the control system adjusts the position of the image projector.

12. The system claimed in claim 1, wherein the adjustable rest translates in horizontal and vertical directions, and rotates about the horizontal and vertical axes.

13. The system claimed in claim 1, wherein the adjustable rest is adjustable to compensate for the height of a viewer.

14. The system claimed in claim 1, wherein the projected image is auto-stereoscopic.

15. The system claimed in claim 1, wherein the adjustable rest is a chair.

16. The system claimed in claim 15, wherein the adjustable rest includes a serv-mechanism.

17. The system claimed in claim 15, wherein the adjustable rest further includes a viewer restraint.

18. The system claimed in claim 1, further comprising a motion platform including a viewer station and on which the image projector is mounted for imparting a sense of motion to the viewer.

19. The system claimed in claim 1, further comprising a sound system capable of creating a perceptual location of a source of sound and wherein the control system adjusts the perceptual location of sound from the sound system in response to viewer movements.

20. The system claimed in claim 1, wherein the adjustable rest further includes means for locating the rest for convenient entry prior to positioning the viewer and for convenient egress following viewing.

21. The system claimed in claim 1, wherein the adjustable rest includes a head-rest for positioning the viewer's head.

22. The system claimed in claim 1, wherein the adjustable rest includes a manual control for allowing the viewer to override the control system.

23. The image display system claimed in claim 1, wherein the control system accommodates for a viewer's height.

24. An image display system, comprising:
a) an image projector including a mirror optical element for forming an exit pupil for viewing an image at a viewing location;
b) a viewer eye position detector for generating a signal representing the position of a viewer's eyes relative to the location; and
c) a control system responsive to the signal for providing relative motion between the viewer and the image projector to maintain the viewer's eyes at the exit pupil;
wherein the viewer eye position detector includes a light source for emitting non-visible radiation and one or more cameras.

25. The system claimed in claim 24, wherein the light source emits infrared radiation.

26. An image display system, comprising:
a) an image projector including a mirror optical element for forming an exit pupil for viewing an image at a viewing location;
b) a viewer eye position detector for generating a signal representing the position of a viewer's eyes relative to the location; and
c) a control system responsive to the signal for providing relative motion between the viewer and the image projector to maintain the viewer's eyes at the exit pupil;
wherein the eye position detector includes means for detecting viewer movement towards and away from the projector and the means for detecting viewer movement employs triangulation.

27. The system claimed in claim 26, wherein the viewer eye position detector employs one or more cameras.

28. The system claimecd in claim 27, wherein the one or more cameras are placed in front of the viewer.

29. The system claimed in claim 27, wherein the one or more cameras are located beside, or in front of the viewer.

30. The image display system claimed in claim 27 wherein the one or more cameras are mounted on the image projector.

* * * * *

UNITED STATES PATENT AND TRADEMARK OFFICE
CERTIFICATE OF CORRECTION

PATENT NO.       : 7,111,939 B2                                        Page 1 of 1
APPLICATION NO.  : 10/084119
DATED            : September 26, 2006
INVENTOR(S)      : Mark E. Bridges et al.

It is certified that error appears in the above-identified patent and that said Letters Patent is hereby corrected as shown below:

Column 6, Line 63, Claim 5    Replace "inclides" with --includes--

Column 7, Line 13, Claim 10   Replace "locaiton" with --location--

Signed and Sealed this

Second Day of January, 2007

JON W. DUDAS
*Director of the United States Patent and Trademark Office*